Figure 1:
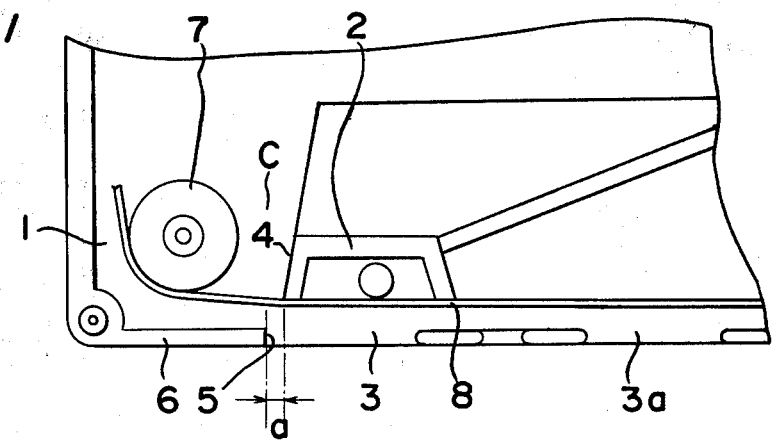

United States Patent [19]

Hashimoto et al.

[11] 4,108,398
[45] Aug. 22, 1978

[54] MAGNETIC RECORDING TAPE CARTRIDGE

[75] Inventors: Noritsugu Hashimoto; Shinichi Kagano, both of Kyoto, Japan

[73] Assignee: Hitachi Maxell, Ltd., Ibaragi, Japan

[21] Appl. No.: 805,032

[22] Filed: Jun. 9, 1977

[30] Foreign Application Priority Data

Jun. 10, 1976 [JP] Japan .............................. 51/75837[U]
Jun. 10, 1976 [JP] Japan .............................. 51/75842[U]

[51] Int. Cl.² .......................... G03B 1/04; G11B 15/32
[52] U.S. Cl. ....................................... 242/199; 242/210
[58] Field of Search .............................. 242/197–200, 242/210; 352/72–78 R; 360/96, 132

[56] References Cited

U.S. PATENT DOCUMENTS 3,642,228   2/1972   Tollkuhn ............................... 242/199
3,796,394   3/1974   Souza .................................... 242/199

FOREIGN PATENT DOCUMENTS 1,052,249   12/1966   United Kingdom ...................... 242/199

Primary Examiner—Leonard D. Christian
Attorney, Agent, or Firm—Birch, Stewart, Kolasch and Birch

[57] ABSTRACT

A magnetic recording tape cartridge which includes partition walls protrusively provided, behind a central opening for insertion of a magnetic recording and reproducing head on the front side of upper and lower cases, said partition walls being extended at their both ends to positions behind the two openings for insertion of a pinch roller and an erasing head on both sides of the central opening, each of said partitions walls being so disposed as to couple at its front surface with the back of U-shaped guide walls provided protrusively on the case opposite to at least one of said openings, so as to ensure suppressing of the deformation of the case caused by warping and allow smooth running of the magnetic recording tape accommodated in the tape cartridge.

5 Claims, 5 Drawing Figures

MAGNETIC RECORDING TAPE CARTRIDGE

The present invention relates to a magnetic recording tape cartridge, more particularly to a magnetic recording tape cartridge provided, behind the tape running surface, with an extended partition walls beyond the positions of a pair of outermost openings.

In the conventional cartridges for magnetic recording tape, there are protrusively provided, behind the front wall which accommodates the magnetic heads, the capstan roller of a tape recorder, and the like, which are disposed in the longitudinal partition walls running direction of the tape on the upper and the lower cases of the cartridge. These partition walls are so constructed that they are made short to accommodate corresponding length of U-shaped guide walls at one end of the partition wall so as not to interrupt the coupling of the U-shaped quide walls which are protrusively provided opposite to either one of the two symmetrical openings centering on the central openings on the front side of the cases. Because of the above construction, the portion of the case adjacent to the opening which is not provided with the partition wall is weak in strength against bending in the direction of the thickness of the case in comparison with that portion provided with the partition wall.

Accordingly, when the case elements having a molding deformation are assembled and tightened together with screws, the resulting cartridge contains distortions in the direction of the thickness of the cartridge due to those portions of the cases having a strength weakness in their structure. In such situations, a deviation of the recording track against the magnetic head or problems in the general running of the tape are frequently experienced.

In the magnetic tape cartridges of the above type, as observed in FIG. 1, there is protrusively provided on the case 1, a U-shaped guide wall 2 to cover the opening 3 adjacent to the central front opening 3a. The outer periphery 4 of the above guide wall 2 against the longitudinal direction of the case 1 is positioned with a space from the extremity 5 of the front wall 6 defining the opening 3. Accordingly, the portion taken along the space a between the outer periphery 4 of guide wall 2 and the extremity 5 of the front wall 6 has a weaker mechanical strength than the other portions of the case 1 in the direction of the thickness of the case. Thus, when the two coupling elements of the case become bent at the weak portions, the relative position of the tape running track to the head may become deviated. Also, because of a space c between the outer periphery 4 of the guide wall 2 and the guide roller 7, there is an apprehension that, when the magnetic tape 8 is loosened, the said tape 8 is liable to be caught by the back of the guide roller 7 at the start of the running operation and when its running is stopped.

An object of the present invention is to provide a magnetic recording tape cartridge which prevents warping of the case and permits smooth running of the magnetic tape.

Another object of the present invention is to provide a magnetic recording tape cartridge provided with an improved mechanical strength.

A further object of the present invention is to provide a magnetic recording tape cartridge which can favorably prevent the trouble of running of the magnetic tape that may result from entangling of the tape which has become loosened from the tape reel on the guide roller.

Figure 2:
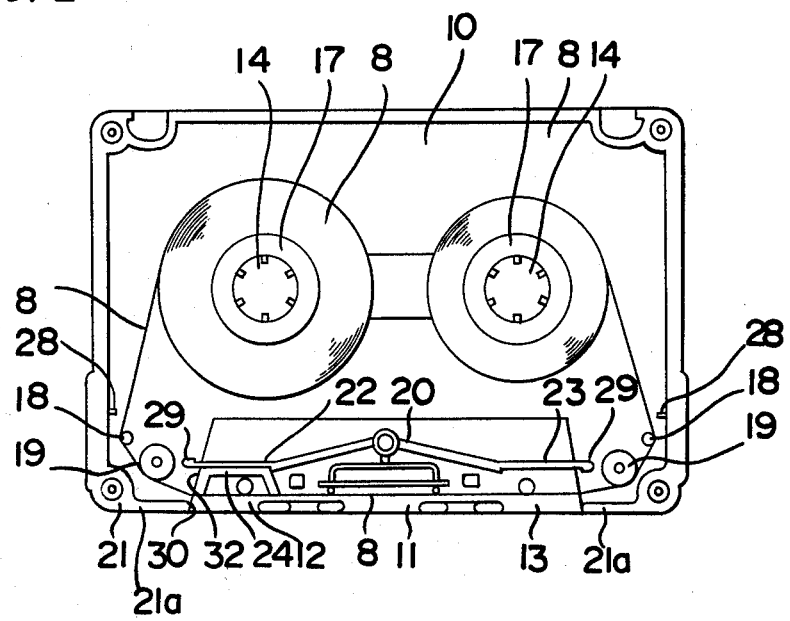
Figure 3:
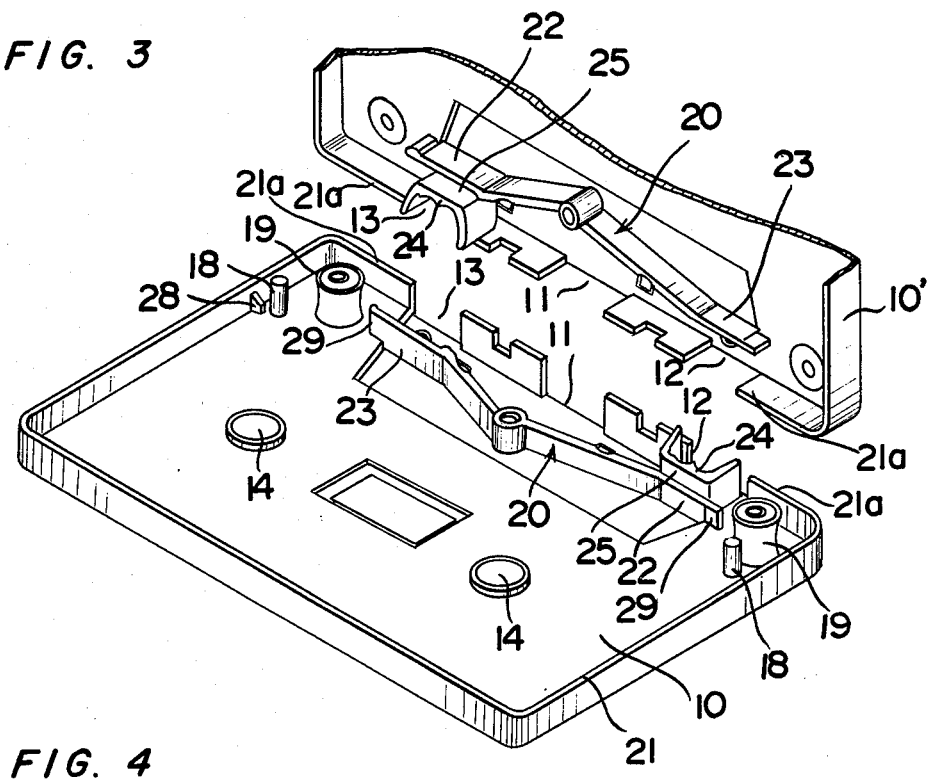
Figure 4:
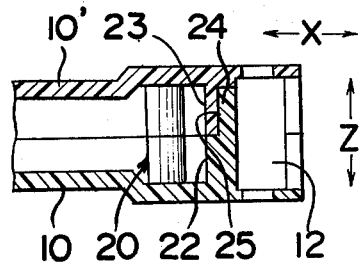
Figure 5:
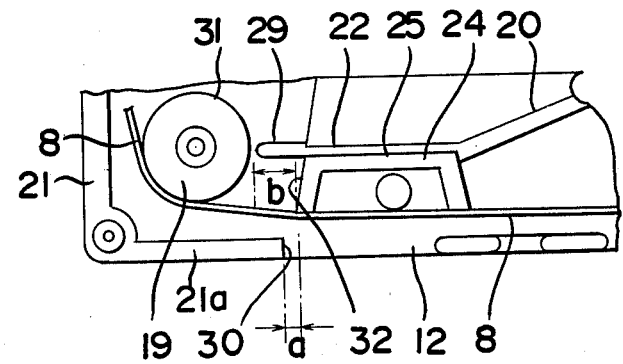

The preferred embodiment of the present invention will be fully described with reference to the attached drawings in which;

FIG. 1 is a plan view of a conventional tape cartridge showing an area in the vicinity of an opening with the upper case removed, FIG. 2 is a plan view of the magnetic recording tape cartridge according to the present invention with the upper case removed, FIG. 3 is a perspective view of a cartridge case used for the magnetic recording tape cartridge of the present invention in a disassembled state, FIG. 4 is a cross-sectional view of an essential part of said case in assembled state, and FIG. 5 is an enlarged illustrative view of a portion in the vicinity of the opening of the magnetic tape cartridge of the present invention with the upper case removed.

In the drawing, the element 10 is a lower case formed by molding plastics such as ABS resin, styrene resin, etc., 11 is the central opening for insertion of the magnetic recording and reproducing head formed on the front side of the lower case 10, and 12 and 13 are the openings formed on both sides of the central opening 11, are provided for insertion of the erasing head and for insertion of the pinch roller provided on a tape recorder (not shown), respectively. The elements 14 are the holes for insertion of the driving shafts of the tape recorder for rotating hubs 17. The hubs 17, which are wound with the magnetic recording tape 8, are mounted on the insertion rules 14 in a freely rotatable manner.

The magnetic recording tape 8, which is led to the front part of the case 10 through the guide pins 18 and the guide rolls 19, provided at the opposite corners of the case 10, is arranged so as to be able to run along the openings 11, 12 and 13.

On the rear side of the openings 11, 12, and 13 there are protrusively provided the partition walls 20 which have the same height as the outer circumferential walls 21 of the lower case 10 and the upper case 10', and which are formed in the body with each of the cases 10 and 10'. The two ends 22, 23 of each partition wall 20 are extended to the positions which cover the both outermost openings 12 and 13, so that the ends 22, 23 overlap the outermost front wall portions 21a, so that, on combination of the lower case 10 and the upper case 10', the partition walls 20 on the lower case 10 and the upper case 10' are coupled together to separate the front area and the rear area of the interior of the assembled case. The members 24 are the U-shaped guide walls which are respectively formed in a body with both the ends 22 of the partition walls 20 and the lower case 10 and the upper case 10' in a manner to encircle the two outermost openings 12 and 13 so as not only to prevent the introduction of dust into the rear area of the case but also to guide the magnetic tape 8 through the front part of the case. As shown in FIG. 4, there are formed on the respective back sides of these guide walls 24 the stepped portions 25 having approximately same depth as the thickness of the end 22 of the partition wall 20, and, when the upper case 10' is coupled with the lower case 10, each end 23 of the partition walls 20 protrusively provided on the opposed cases 10 and 10' is engaged with the stepped portion 25 of the opposite guide walls 24, so that the back surface of the end 23 of the partition wall 20 is aligned with the back surface of the end 22 of the opposite partition wall 20, respectively, on combination of the lower case 10 and the upper case 10'. The members 28 are ribs provided adjacent to each of the guide pins 18, to prevent the entangling of the loosened tape coming into the space between the guide pin 18 and the inner lateral surface of the case 10.

As is apparent from the above constitution, because the two ends 22 and 23 of the partition wall 20 are extended to the positions which cover the two outermost openings 12 and 13, the cases 10 and 10' are assembled together without warping by the aid of the reinforcing actions of the rib formed by the ends 22 and 23 of the partition walls, respectively.

Of course, the function of suppressing the warping of the case is sufficiently obtainable simply by contacting the end 22 of the partition wall 20 with the back of the guide wall 24, without coupling them.

However, when, as in the above example, a case is so constructed that the back of the guide wall 24 is formed with the step 25 and the end 23 of the partition wall 20 is coupled with the step 25, the assembled cartridge is provided with further improved mechanical strength in either the direction of the thickness Z or the back and forth direction X.

Furthermore, when an aligned surface is formed by the back surface of the ends 22 and 23 of the opposed partition walls 20 as above, the magnetic recording tape which becomes loosened behind the partition wall 20 is advantageously protected from damage, even if the magnetic tape touches the partition wall 20.

When one of the U-shaped guide walls 20 is provided on the lower case 10 and the other on the upper case 10', the reciprocal actions of the guide walls 20 with the ends 23 of the partition walls work to suppress the deviation in the assembled cases in the back and forth direction X, thus permitting assembly of the upper and the lower cases with a high precision.

Further, as shown in FIG. 5, the extremity 29 of the end 22 of the partition wall 20 is extended beyond the position of the extremity 30 of the front wall defining the outermost opening 12 to the position nearly adjacent to the outer circumference 31 of the guide roller 19. Accordingly, the length b of the extremity 29 of the partition wall 20 protruding from the U-shaped guide wall 20 is longer than the space a defined between the extremity 30 of the front wall 11 and the outer periphery 32 of the U-shaped guide wall 24, thereby providing a reinforcement to the case of the portion having the above space a. Because of this construction, warping of the case 10 in the direction of its thickness can be prevented, and deviation of the relative position of the tape running track to the head can be prevented. Additionally, the construction that the extremity 29 of the partition wall 20 is positioned adjacent to the circumference 31 of the guide roller 19 is effective for preventing the tape 8 from coming into the gap between the guide roller 19 and the partition wall 20, thereby ensuring smooth running of the tape.

What is claimed is:

1. A recording tape cassette having top and bottom cases defining an enclosure with a front wall having a plurality of apertures along the front edge thereof, a pair of guide means supported within the enclosure, a tape guide path extending between said guide means and adjacent said apertures, a pair of U-shaped guide walls having a height higher than the width of the recording tape and extending from either the bottom or the top of said cases, and adapted to extend behind the outermost apertures of the front wall and a pair of partition walls, each having a height substantially equal to about one-half of the inner height of the enclosure, each of said partition walls protrudingly extending from the top and bottom portions of said cases behind said plurality of apertures in the front wall of the enclosure and extending to cover all of said apertures, said partition walls being so arranged that the front surface of at least one of the end portions of a partition wall on one of the cases engages with the back surface of the corresponding U-shaped guide walls provided on the other case to cover said outermost aperture of the front wall of the case, said U-shaped guide wall acting as a stopping means through said engagement with the partition wall to prevent transverse sliding between the top and bottom cases.

2. The recording tape cassette of claim 1, wherein one U-shaped guide wall extends from the top case and one U-shaped guide wall extends from the bottom case, on opposite sides of the tape cassette.

3. The magnetic recording tape cartridge according to claim 1, wherein stepped sections are formed on the back surfaces of the U-shaped guide walls so that the opposing end portions of the partition walls on the top and bottom cases are disposed to couple with said stepped portions.

4. The magnetic recording tape cartridge according to claim 1, wherein the extremities of the partition wall extend to positions adjacent to the guide rollers.

5. The magnetic recording tape cartridge according to claim 4, wherein the partition wall extends to the positions overlapping front wall defining the outermost apertures of the case.

* * * * *